United States Patent

[11] 3,623,719

| [72] | Inventors | Jiri Dokoupil<br>Oberursel/Taunus;<br>Jiri Zubik, Oberstedten/Taunus, both of<br>Germany |
|---|---|---|
| [21] | Appl. No. | 863,585 |
| [22] | Filed | Oct. 3, 1969 |
| [45] | Patented | Nov. 30, 1971 |
| [73] | Assignee | Maschinenfabrik Turner A.G.<br>Oberursel/Taunus, Germany |
| [32] | Priorities | Oct. 7, 1968 |
| [33] | | Germany |
| [31] | | P 18 01 674.5;<br>July 18, 1969, Germany, No. P 19 36 717.0 |

[54] METHOD AND APPARATUS FOR TRANSFERRING FLAT, FLEXIBLE SHEETS ONTO A CONVEYOR
22 Claims, 7 Drawing Figs.

[52] U.S. Cl. ............................................. 271/12, 271/45
[51] Int. Cl. ............................................. B65h 5/02
[50] Field of Search ............................................. 271/12, 11, 14, 8, 26, 45

[56] References Cited
UNITED STATES PATENTS

| 2,402,048 | 6/1946 | Hyde et al. | 271/42 X |
| 2,716,765 | 9/1955 | Quinn et al. | 271/62 X |
| 3,385,594 | 5/1968 | Preisig | 271/12 |

*Primary Examiner*—Joseph Wegbreit
*Attorney*—Wolfgang G. Fasse

ABSTRACT: The present invention relates to a method and apparatus for transferring flat, flexible sheets, especially leather from a storage position to a conveyor, wherein the sheets are first placed on a movable surface while maintaining such surface in a substantially vertical position and then tilting the surface toward said conveyor. The apparatus for performing such method comprises a movable, tiltable surface supported on a frame and sheet suction means movable back and forth between a sheet storage position and a position above the frame, said surface comprising at least one endless belt or a series of rollers actively driven, said rollers being rotatably supported on shafts rigidly connected to each other and one of the shafts being operatively connected to tilting means which tilt the movable surface constituted by said belt or rollers back and forth through a tilting angle to direct the sheet toward said conveyor.

INVENTORS
JIRI DOKOUPIL
JIRI ZUBIK
BY
Nolte & Nolte
ATTORNEYS

PATENTED NOV 30 1971

INVENTORS
JIRI DOKOUPIL
JIRI ZUBIK

BY *Nolte & Nolte*
ATTORNEYS

PATENTED NOV 30 1971

INVENTORS
JIRI DOKOUPIL
JIRI ZUBIK
BY
Nolte & Nolte
ATTORNEYS

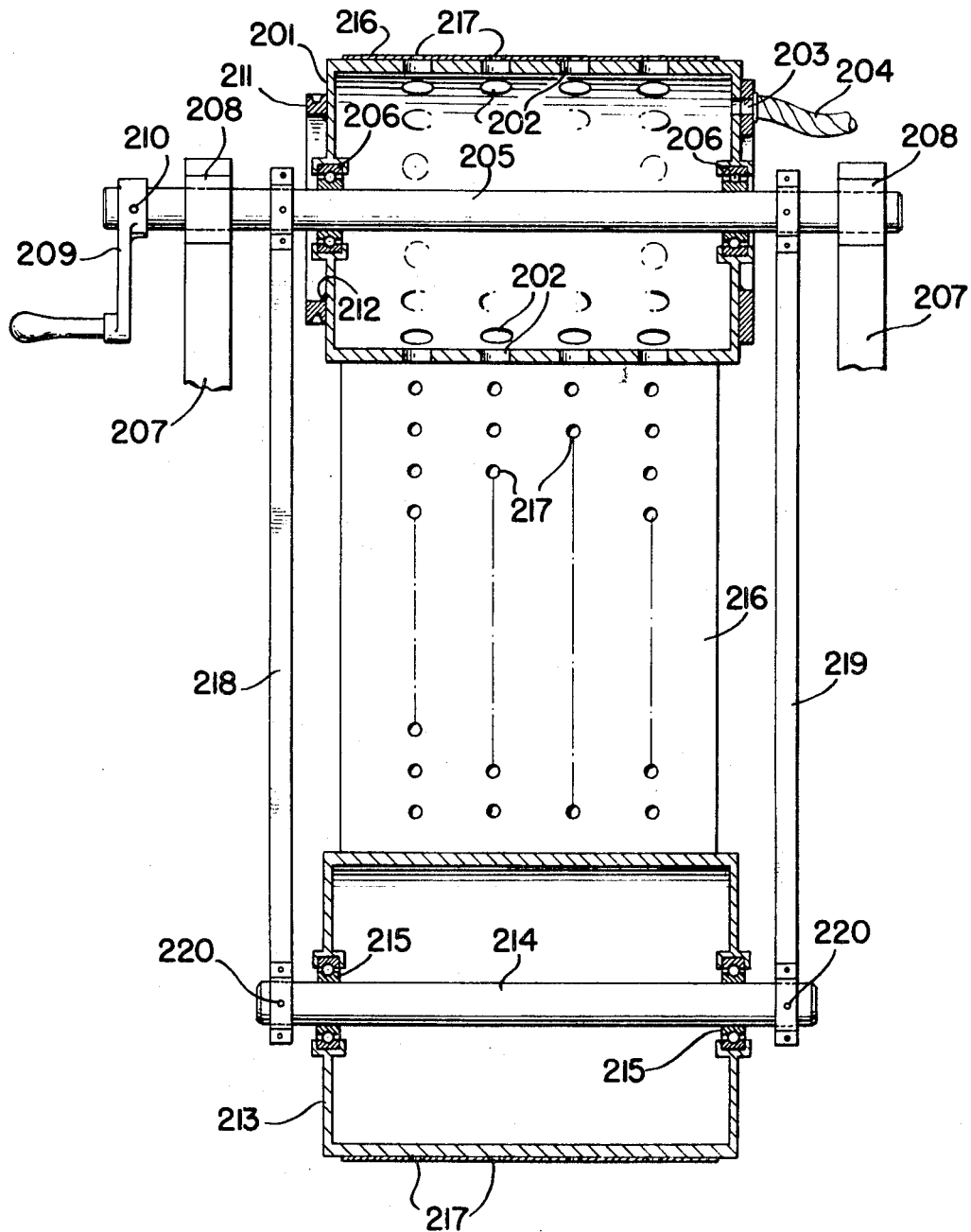

METHOD AND APPARATUS FOR TRANSFERRING FLAT, FLEXIBLE SHEETS ONTO A CONVEYOR

BACKGROUND OF THE INVENTION

The present invention relates to a method and an apparatus for conveying flat, flexible sheets such as pieces of leather or webs or the like from a storage position to a conveyor. Such conveying or transmitting is especially necessary in connection with the handling and treating of leather in which pieces of leather frequently in the form of entire hides or half hides are first placed in a storage position, for example on a storage buck. From the buck the hides or half hides must then be transmitted or fed to a conveyor which, for example, may constitute the input end of a leather working or processing apparatus.

Generally the leather is deposited on a storage buck because such buck is especially space saving. However, the invention is not limited to the use of a storage buck.

Prior to the present invention the pieces of leather or other flexible sheet material were transferred by hand from the storage position or buck to the conveyor. This transfer is technically complicated because they rest on the buck in a folded position in which the ends of the sheet hang down on either side of the buck so that the sheets must be brought from said folded position into a substantially horizontal or flat position.

In the prior art it has been disclosed how to transfer pieces of leather from a stationary storage buck to a movable storage buck in an automated manner. In this connection reference is made to French Pat. No. 1,345,315 wherein a suction lifting means is employed which picks up the topmost piece of leather resting on the stationary storage buck. The lifted piece of leather is then shifted along with an entire suction device laterally to a position where it is dropped above the movable storage buck by releasing the suction effect. Such device is not capable of transmitting the flexible sheet material to a conveyor in a smooth or flat position.

Prior art devices are also not capable of turning sheets around while they are being transferred to a conveyor, for example, so that in connection with leather the top or grain side which faces downwardly in the storage position faces upwardly on the conveyor.

OBJECT OF THE INVENTION

In view of the above it is an object of the invention to overcome the above drawbacks.

Another object of the invention is to transfer flat sheet material, especially leather, from a folded storage position or from a flat storage position to a conveyor in such a manner that the sheets will be placed in a flat or smooth position on the conveyor. Yet another object of the invention is to provide means for turning the sheets during their transfer from a storage position to the conveyor so that a surface previously facing downward may be now placed on the conveyor facing upwardly or vice versa.

SUMMARY OF THE INVENTION

According to the method of the invention a lifting device, such as a suction member engages the sheet at its center and lifts it in order to transfer it longitudinally to a position adjacent the storage position where the sheet is dropped onto a movable surface which at the time when the sheet is being dropped, is in a substantially vertical position. After the sheet has been dropped the movable surface, such as a transport belt or a plurality of rollers extending in parallel to each other and forming a movable surface is tilted so that its lower end is directed toward the conveyor.

In the apparatus according to the invention the lifting means such as a suction lifter, is movably supported in guide means above the storage position, which guide means extend laterally to a position above said tiltable movable surface.

Preferably, the guide means comprise guide rails which extend longitudinally above the upper edge of the movable and tiltable surface in its substantially vertical position.

The movable surface is tiltably supported in a frame which is rotatable about an axis adjacent to said upper edge of the movable surface in such a manner so that the end of the movable surface opposite said ridge points toward the input end of said conveyor. The structure of the tiltable movable surface may take different forms. An especially simple construction comprises two guide rollers on which is supported an endless conveyor belt. The top guide roller is tiltably supported in a frame and the rotational axes of the two guide rollers are rigidly connected to each other for said tilting whereby the movable surface constituted by said belt is tilted about the rotational axis of the top roller.

It is also possible according to the invention to construct the tilting and movable surface in such a manner it comprises portions one of which is tiltable toward said conveyor whereas the other one is tiltable in the opposite direction so that the two surface portions constitute in their horizontal position one substantially continuous surface for flattening the sheets and moving them in a flat, smooth position toward the input end of said conveyor. For this purpose the two surfaces in their nontilted position extend substantially vertically with two upper rollers and with two lower rollers, said upper rollers being tiltably supported in said frame. Air means may be provided for simultaneously tilting said separate movable surface portions, for example, in the form of two conveyor belts, in opposite directions. Thus, the folded sheet or piece of leather is flattened out by the tilting movement and the surface portion pointing toward a conveyor moves the sheet toward the input end of the transport conveyor whereby both portions of the movable surface rotate in the same direction, for example in a clockwise direction.

For the purpose of turning a sheet around so that a surface initially facing downwardly now faces upwardly the invention provides two conveyor belts arranged in parallel to each other whereby the belts are always driven in opposite directions whereby the direction of rotation is controlled in such a manner that the runs which face each other move in the same direction either toward or away from the input end of the conveyor so that the respective sheet is moved toward the conveyor either between the two belts of the tiltable surface or along one return run of the belt constituting said tiltable movable surface.

The just-described two-belt structure for turning the sheet surfaces around while moving a sheet to the conveyor is especially useful in a tannery where it is frequently necessary to deposit pieces of leather on a storage buck in such a manner that in the stack of sheets the same surfaces face each other that is, that a grain surface faces a grain surface and that an inner surface faces an inner surface. However, for the next following working step the leather pieces must be fed in a uniform manner, that is either all the grain sides must be facing up or all the inner surfaces must be facing up.

In order that the invention may be clearly understood, it will now be described, by way of example, with reference to the accompanying drawings, wherein:

FIG. 7 illustrates on an enlarged scale partially in section a view of a tilting mechanism suitable for use in any of the embodiments of FIGS. 1 to 6.

Figure 1:
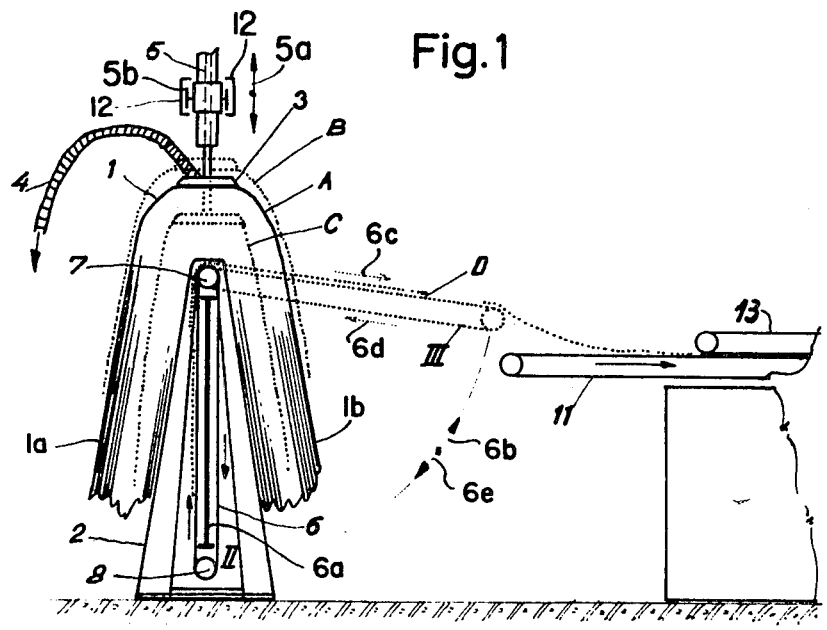
FIG. 1 illustrates a schematic side view of an embodiment according to the present invention having one tiltable, movable surface member.

Referring to FIG. 1, flexible material in the form of sheets 1 rest on a storage buck 2 in several layers stacked one on top of the other. Ends 1a and 1b are folded downwardly to the right and left of the storage buck 2 so that a ridge is created along the top of the buck. The end portions 1a and 1b reach downwardly substantially to the same extent on either side of the buck. This arrangement is rather space saving and the buck carries a large number of pieces of flexible material, for example leather.

Above the storage buck 2 and above the sheets resting on the buck, there is arranged a lifting device in the form of a suction member 3. The suction member 3 is attached to an evacuating pump by means of a hose, preferably a flexible hose 4. The evacuating pump is not shown as not being part of the invention. Furthermore, the suction member 3 is attached to a lifting mechanism 5 capable of lifting the suction mechanism up and down as shown by the arrows 5a and further capable of moving horizontally, for example, on wheels 5b which move along guide rails 12.

Figure 2:
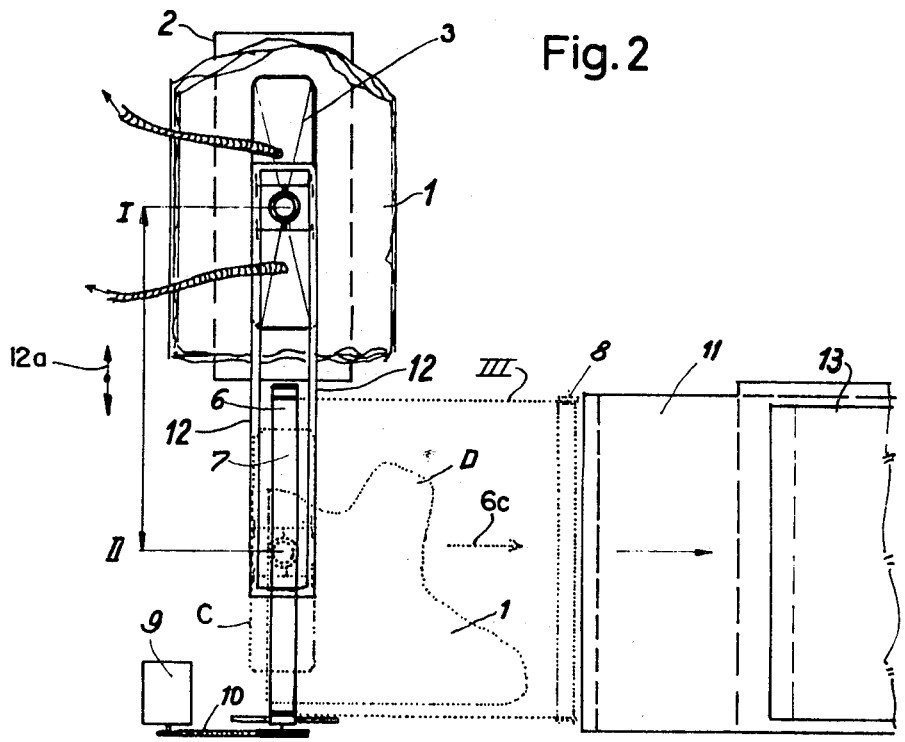
FIG. 2 illustrates a top view of the apparatus according to FIG. 1.

The guide rails 12 are arranged above the storage buck 2 and extend laterally over a movable tiltable surface to such an extent that the suction member 3 is horizontally movable back and forth as indicated by the arrow 12a between a pickup position I and a sheet-dropping position II as best seen in FIG. 2.

The tiltable and movable surface comprises an endless belt 6 which is movable, for example, by guide rollers 7 and 8 of which the upper guide roller 7 has an axis tiltably supported in a frame structure, for example, as shown in FIG. 7. The frame structure for the tilting mechanism will be aligned with the storage buck 2.

The apparatus operates as follows. The suction member 3 is lowered and by its suction effect picks up the top sheet resting on the storage buck 2, so that the sheet 1 takes up the solid line position A as shown in FIG. 1. The suction member 3 is then lifted somewhat by the lifting apparatus 5 so that the sheet 1 takes up the dotted position B. With the sheet 1 in the dotted line position B the suction member 3 is moved horizontally from position I into position II thus longitudinally along the storage buck 2 and the tilting mechanism comprising rollers 7 and 8 as well as the endless belt 6. Such lateral or horizontal movement of the suction member and lifting apparatus along rails 12 is followed by a lowering of the lifting apparatus 5 so that the sheet 1 takes up the dotted line position C as shown in FIGS. 1 and 2.

In the full line position the tilting mechanism 6a with the belt 6 extends substantially vertically. When the suction member 3 has reached its position II the sheet 1 hangs down above the tilting mechanism 6a. Now, when the suction effect is switched off, the suction member 3 will drop the sheet 1 onto the vertically extending endless belt 6 whereby the sheet is folded so that its ends 1a and 1b hang down on either side of the top roller 7.

The tilting mechanism 6a now performs a tilting motion whereby the lower roller 8 of the tilting mechanism moves in the direction of the arrow 6b whereby the movable and tiltable surface of the belt 6 reaches a position III shown in dotted lines in FIGS. 1 and 2 and the sheet 1 takes up a position D also as shown in FIGS. 1 and 2. The details of the tilting mechanism will be discussed with reference to FIG. 7.

When the tilting mechanism has reached its position III the movable surface points in a direction toward a conveyor system comprising a lower belt 11 and an upper belt 13 which transports the sheet 1 to a further processing location not shown. The lower guide roller 8 of the endless belt 6 thus takes up an elevational position sufficient so that the sheet 1 which advances along the endless belt 6 will automatically be deposited on the lower belt 11 of the conveyor. For this purpose the endless belt 6 is moved in the clockwise direction as indicated by arrows 6c and 6d. This may, for example, be accomplished by a drive motor 9 which drives the upper transport roller 7 through a chain belt drive 10. Thus the sheet 1 advances from its position D to the right and is directly received by the conveyor 11. When the sheet 1 leaves the upper run of the belt 6 the tilting mechanism is moved downwardly as indicated by the arrow 6e.

In practicing the present invention care must be taken that the tilting of the tilting mechanism and the advance of the endless belt 6 are properly coordinated or synchronized with each other. Thus, it is possible to effect the tilting first and then advance the belt 6 or it is possible to continuously drive belt 6 in which instance it is essential that the tilting is effected instantly after the dropping of the sheet by the suction member 3. This is necessary in order to avoid that the sheet 1 would be advanced by the belt 6 so that it would slip off belt 6 prior to reaching a sufficient elevation for being dropped onto conveyor 11.

Figure 3:
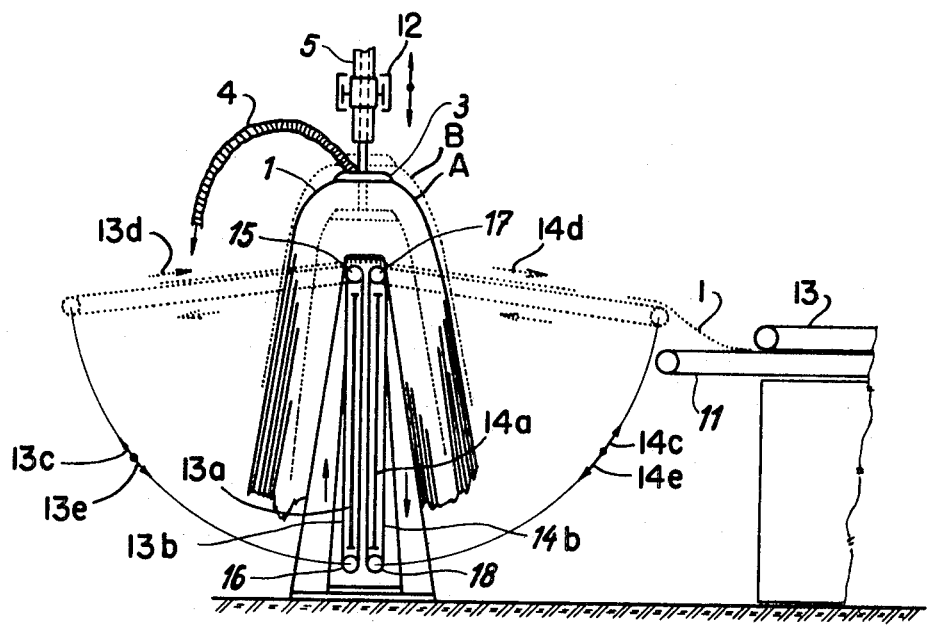
FIG. 3 illustrates a side view of an embodiment similar to that of FIG. 1, however, comprising two movable surfaces tiltable in opposite direction.

Referring now to FIG. 3 there is illustrated an embodiment of the invention especially constructed for avoiding that a sheet will drop off the tilting mechanism in the wrong direction prior to its being advanced in the proper direction toward the conveyor 11. For this purpose the embodiment of FIG. 3 comprises two movable and tiltable surfaces. In the rest position as illustrated by the full lines in FIG. 3 the two tiltable and movable surfaces extend in parallel to each other and substantially vertically. The two endless belts 13b and 14b are supported by upper drive rollers 15 and 17 and by lower guide rollers 16 and 18. While the two movable surfaces are in the vertical position the suction member 3 drops a sheet 1 so that the sheet will straddle said surfaces as indicated by the dotted line position C. Thereafter the two movable surfaces are tilted upwardly, but in opposite direction. Thus, the belt 14b is tilted upwardly in the direction of the arrow 14c in a counterclockwise direction while the surface constituted by belt 13b is tilted upwardly in the direction of the arrow 13c thus moving in the clockwise direction to establish a substantially horizontal surface for the sheet 1 which will then be advanced in the direction of arrow 13d and 14d since both belts 14b and 13b are advanced in the same direction whereby the sheet 1 is moved onto the conveyor 11 and is prevented from slipping off on the wrong side.

Figure 4:
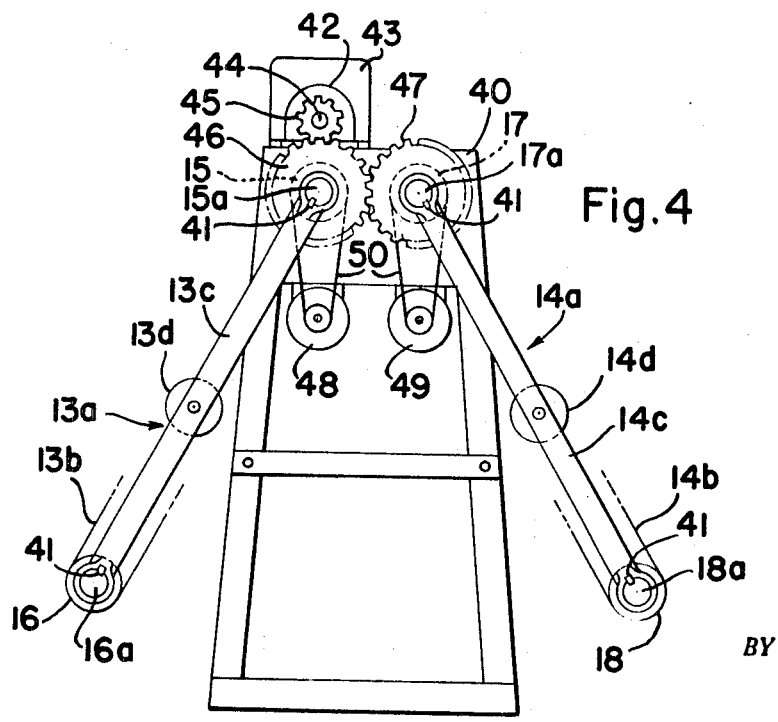
FIG. 4 is a partial side view of an enlarged scale of an apparatus according to FIG. 3.

FIG. 4 illustrates details of the tilting mechanisms employed in FIG. 3. The transport rollers 15, 16, 17 and 18 are rotatably supported on shafts 15a, 16a, 17a and 18a. The shafts 16a and 17a are journaled in a frame structure 40, which if desired may be part of the storage buck 2.

The upper drive shaft 15a is rigidly connected through a rod 13c to the shaft 16a of the lower guide roller 16, for example, by means of keys and keyways 41, and the intermediate guide rollers 13d and 14d may also be supported along said rods. If desired, said rollers may be arranged so that a plurality thereof touch each other whereby the movable surface would be constituted by said rollers thus obviating the need for an endless belt.

Referring again to FIG. 4, the tilting mechanism comprises a motor 42 supported on a bracket 43 attached to the frame 40. The motor 42 drives with its shaft 44 a pinion 45 which meshes with a gear 47 rigidly attached to the shaft 15a. The gear 46 meshes with another gear 47 rigidly attached to the shaft 17a. Thus, the tilting may be accomplished by a single reversible motor and, if necessary, through proper reduction gears.

When the reversible motor 42 turns in the clockwise direction the gear 46 will turn in the counterclockwise direction and the gear 47 will turn in the clockwise direction thus moving the tilting mechanisms 13a and 14a inwardly or back to their substantially vertical position. On the other hand, when the reversible motor rotates its shaft 44 in the counterclockwise direction the gear 46 will move in the clockwise direction whereby the tilting mechanisms 14a and 13a are moved toward the substantially horizontal position as indicated by dotted lines in FIG. 3. For returning the two tilting mechanisms to the vertical position in the direction of arrows 13e and 14e the motor 42 would again be reversed to rotate in the clockwise direction.

The drive rollers 15 and 17 for the belts 13b and 14b are driven by motors 48 and 49 also supported by the frame 40 and operatively connected to the rollers 15 and 17 by means of belt or chain drives 50.

Figure 5:
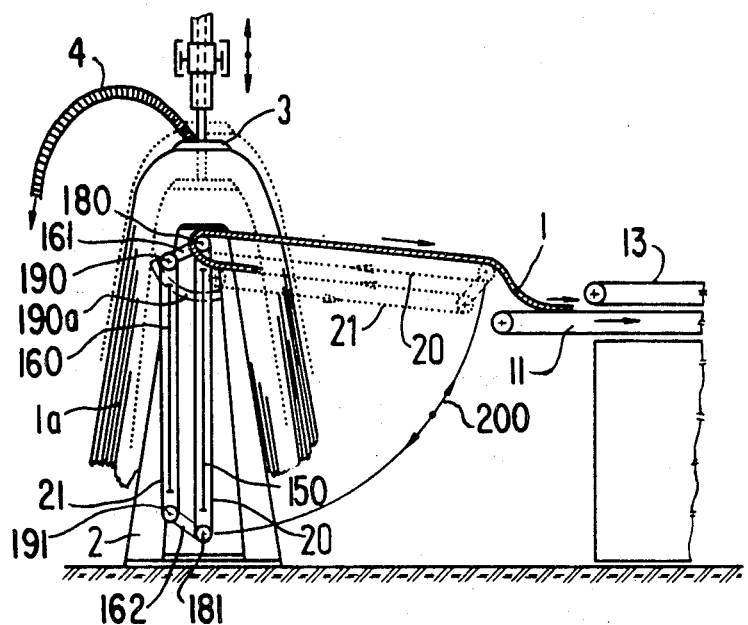
FIG. 5 illustrates a different embodiment according to the invention having two movable surfaces but tiltable in the same direction and suitable for reversing the surfaces of a sheet.
Figure 6:
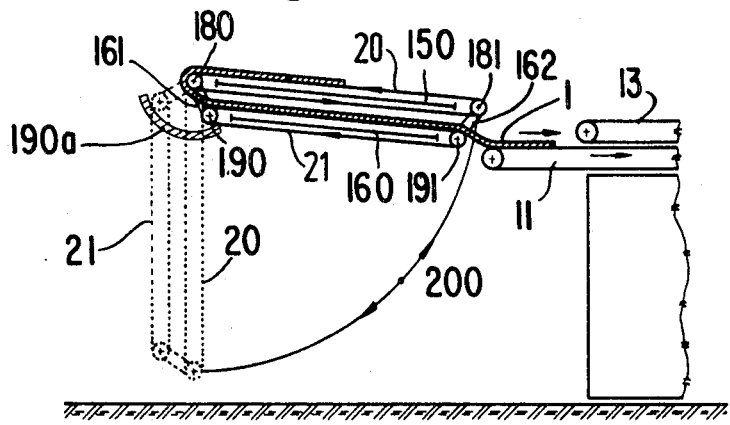
FIG. 6 is an embodiment similar to that of FIG. 5, however with the sheets advancing between two movable surfaces.

Referring now to FIGS. 5 and 6 the arrangement is similar to that in FIG. 1 in that the sheets 1, for example, of leather are folded on a storage buck 2 so that the ends extend downwardly on either side of the buck to the same extent. The lifting and depositing of the sheet 1 by means of the suction member 3 is accomplished in the same manner as described with reference to FIG. 1. However, the embodiment of FIGS. 5 and 6 comprises two tilting mechanisms 150 and 160 which are rigidly coupled with each other, for example, by upper and lower thrust rods 161 and 162. The tilting mechanism 150 comprises an upper drive roller 180 and a lower guide roller 181 on which an endless belt 20 is rotatably supported. The tilting mechanism 160 also comprises an upper guide roller 190 and a lower guide roller 191 on which an endless belt 21 is drivingly supported. A shaft of drive roller 180 is journaled in the frame structure, for example, of the storage buck 2.

To facilitate the tilting movement in the same direction up and down as indicated by the double arrow 200 there is attached to the frame structure a guide rod 190a on which a shaft of the upper guide roller 190 may glide back and forth.

The apparatus according to FIGS. 5 and 6 operates as follows. As soon as the suction member 3 has lifted a sheet 1 sufficiently, one edge of the sheet will be introduced between the endless belts 20 and 21, more specifically, between the inner runs of such belts which face each other. The sheet 1 is then dropped whereupon the two tilting mechanisms 150 and 160 tilt in the upward direction about the shaft of the upper drive roller 180. The fully upward tilted position is shown in dotted lines in FIG. 5 illustrating a sufficient elevation for the sheet 1 to be dropped onto the conveyor 11. The simultaneous tilting is assured due to the rigid interconnection by the rods 161, 162.

The advance of the sheet 1 is accomplished by the rotation of the endless belts 20 and 21 in opposite directions. Depending upon the direction of movement of belts 20 and 21 either the upper surface of the sheet 1 or its lower surface will be facing up when it reaches the conveyor 11. In any event the two conveyor belts 20 and 21 move in opposite directions as indicated by the arrows in FIGS. 5 and 6. Such movement in opposite directions assures that the inner runs which face each other move in the same direction either away from the conveyor 11 or toward the conveyor 11.

In FIG. 5 the inner runs of belts 20 and 21 move away from the conveyor 11 whereby the sheet 1 is moved toward the conveyor by the upper run of the belt 20. As a result, the surface of the sheet 1 which faced outwardly when the sheet 1 was resting on the storage buck 2 will be facing upwardly when the sheet 1 reaches the conveyor 11.

However, if the surface of the sheet 1 which faced inwardly when the sheet was resting on the storage buck 2 is to face upwardly when the sheet reaches the conveyor 11, then the direction of rotation of the belts 20 and 21 is reversed whereby they retain their opposite sense of direction. This is shown in FIG. 6 where one end of the sheet 1 is again inserted between the oppositely rotating belts 20 and 21. However, since now the inner runs of these belts which face each other move toward the conveyor 11, the sheet 1 is drawn completely into the space between the inner runs of conveyors 20 and 21 so that the sheet is now advanced to the conveyor 11 between the inner runs of belts 20 and 21. As can be ascertained for FIG. 6 the surface of sheet 1 previously facing inwardly now faces upwardly on conveyor 11.

The belts 20 and 21 may be driven by electric drive motors as shown in FIG. 4 which are reversible in order to control the direction of movement of the belts 20 and 21. Thus, it is possible to place a sheet 1, such as leather, with the desired surface facing upwardly on the conveyor 11 depending on the position of the sheet 1 on the storage buck 2 and depending on the direction of rotation of the belts 20 and 21. Such reversible drive means are well known in the art. Therefore, a detailed discussion is not necessary. However, since the two belts 20 and 21 always move in opposite directions it is possible to use but one drive motor with appropriate gearing between the driven upper roller and the other upper roller the drive for which is derived from the driven upper roller.

In order to facilitate the insertion of one edge of the flexible sheet between the two belts 20 and 21 it is preferable to drive the belts in such a manner that their inner runs which face each other move toward the conveyor 11. Thus, the one edge of the sheet 1 will be pulled, so to speak, into the space between the inner runs so that such edge will be positively engaged between the belts 20 and 21.

Referring now to FIG. 7 there is shown a transport roller in the form of a drum 201 having in its surface apertures 202 and including a valving mechanism 203 for connecting the space inside the drum to a vacuum pump not shown for example through a flexible hose 204. The drum 201 is rotatably supported on shaft 205 by means of bearings such as sleeve bearings or ball bearings 206 as shown.

The shaft 205 in turn is journaled for its tilting movement in a frame structure parts of which are shown at 207 supporting a journal box 208.

The tilting may be accomplished in its simplest embodiment, for example, by a hand-operated crank 209 secured to the free end of the shaft 205 for example by a pin 210.

The drum 201 will constitute an upper drive roller to which is attached a drive ring 211 for example by a weldment 212 and over which a belt, for example, a V-belt may run as shown in FIG. 4.

The lower drive roller 213 is rotatably supported on a shaft 214 for example by ball bearings 215. A belt 216, preferably with perforations 217 is drivingly supported by the upper drum 201 and by the lower guide roller 213.

To assure a proper tilting the lower shaft 214 is rigidly connected to the upper shaft 205, for example, by means of rods 218 and 219, the ends of which are secured to the shaft for example by bolts 220.

The features shown in FIG. 7 are suitable for combination in any of the FIGS. 1 to 6. For example, if it is necessary to assure a proper clinging of the sheet 1 to the movable surfaces especially in the embodiments of FIGS. 1, 2, or 5, 6, the upper drive rollers could be provided in the form of evacuable apertured drums and the belts could be provided with perforations for the purpose of holding the sheets 1 to the surface of the belts. Where the belt material is permeable to air it would not be necessary to provide the belt with perforations for the purpose of holding the sheets to the surface of the belt by means of suction.

The particular tilting and drive features for the movable surfaces would also be employed in connection with any of the embodiments shown and in any combination disclosed.

What we claim is:

1. A method for transferring flat, flexible sheets from a storage point onto a conveyor, comprising the steps of lifting at least one of said sheets, depositing the lifted sheet onto a movable surface so that the deposited sheet hangs down on each side of said movable surface so as to cover separate portions of said movable surface while maintaining said separate surface portions in a substantially vertical orientation, and tilting said separate portions so that one of its ends points toward said conveyor and moving said surface whereby the moving of the surface in combination with its tilting transfers the sheet onto said conveyor.

2. The method according to claim 1, comprising depositing said sheet so as to insert a sheet edge between two separate portions of said movable surface, and tilting said surface portions in the same direction toward said conveyor.

3. The method according to claim 1, wherein said separate portions of the movable surface are tilted in opposite directions so that runs of said surface portions facing each other in said substantially vertical orientation move in the same direction.

4. The method according to claim 3, comprising moving said runs facing each other in a direction away from said conveyor for advancing the sheet toward the conveyor on a return run of one of said surface portions.

5. The method according to claim 2, comprising moving said runs facing each other in a direction toward said conveyor for advancing the sheet toward said conveyor between said runs which face each other.

6. An apparatus for transferring flat, flexible sheets from a storage position onto a conveyor, comprising movable sheet-lifting means, guide means supported above said storage position, means operatively connected to said sheet-lifting means for moving said sheet-lifting means along said guide means, tilting means including a frame located adjacent said storage position, said guide means for the sheet-lifting means extending laterally above said tilting means and above the storage position, said tilting means comprising spaced, rotatable means supported by said tilting means and adapted to constitute a movable surface, drive means operatively connected for driving the movable surface, and means operatively connected for swinging said tilting means back and forth through a tilting angle between a substantially vertical sheet-receiving position of said movable surface and a sheet-advancing position of said movable surface.

7. The apparatus according to claim 6, wherein said lifting means comprise suction members adapted to contact said sheets along a predetermined area.

8. The apparatus according to claim 6, wherein said spaced, rotatable means comprise at least an upper roller and a lower roller, each roller having a longitudinal rotational axis, said guide means comprising rails extending above and in parallel to said longitudinal axis of the upper roller.

9. The apparatus according to claim 8, further comprising a shaft for said upper roller and a shaft for said lower roller, means for rotatably supporting each roller on its respective shaft, means for rotatably supporting said shaft for the upper roller in said frame of the tilting means, means attached to the upper roller shaft for rotating the upper roller shaft through a tilting angle, and means for rigidly connecting the upper roller shaft with the lower roller shaft whereby rotating the upper roller shaft through said tilting angle tilts the lower roller in a predetermined direction, especially in the direction toward said conveyor.

10. The apparatus according to claim 8, further comprising at least one endless belt supported by said upper and lower roller.

11. The apparatus according to claim 8, comprising means for rotatably supporting said upper roller on said tilting means, and means for swingably supporting said tilting means in said frame relative to the longitudinal rotational axis of said upper roller.

12. The apparatus according to claim 8, comprising means operatively connected to said upper roller for rotating the upper roller.

13. The apparatus according to claim 6, wherein said tilting means comprise two separate tilting members, each member including an upper and a lower rotatable means spaced from each other and supported by said tilting means, said tilting members constituting separate movable surfaces, said means for swinging said tilting means being adapted for swinging one tilting member clockwise and the other tilting member counterclockwise from a substantially vertical position in which said tilting members extend in parallel to each other to a substantially horizontal position wherein the rotatable means of both tilting members constitute said movable surface.

14. The apparatus according to claim 13, wherein said means for swinging said tilting means comprise gear means for driving said gear means, and means for operatively connecting the gear means to said separate tilting members for tilting the members simultaneously but in opposition directions.

15. The apparatus according to claim 10, wherein said endless belt is air-permeable, at least said upper roller being in the form of a hollow drum comprising a surface with apertures therein, said apparatus further comprising a valving mechanism for connecting the drum to evacuating means.

16. The apparatus according to claim 15, wherein said endless belt comprises perforations therein in alignment with said apertures in the drum surface.

17. The apparatus according to claim 6, wherein said tilting means comprise at least two upper rotatable surface means and two lower rotatable surface means, upper and lower rotational axes for said rotatable means, the rotational axis for one of said upper means being supported in said frame, means for rigidly connecting said rotational axes with each other, said means for swinging said tilting means being adapted for swinging said lower rotatable means simultaneously in the same direction.

18. The apparatus according to claim 17, wherein said rotatable means comprise two upper rollers and two lower rollers and two belts each supported by an upper and a lower roller, and means operatively connected to said rollers for driving said belts in opposite directions whereby parallel runs of said belts facing each other run in the same direction.

19. The apparatus according to claim 18, wherein said parallel runs facing each other advance toward said conveyor, whereby said sheet is moved to the conveyor between said parallel runs.

20. The apparatus according to claim 18, wherein said parallel runs facing each other advance in the direction away from said conveyor whereby said sheet is advanced toward said conveyor on a return run of said belts.

21. The apparatus according to claim 18, further comprising means for drivingly coupling two of said rollers which are arranged adjacent to each other.

22. The apparatus according to claim 18, comprising tilt guide means attached to said frame, said rotational axis of at least one of said rollers having ends movably supported in said tilt guide means to move therealong when said tilting means swing through said tilting angle.

* * * * *

UNITED STATES PATENT OFFICE
CERTIFICATE OF CORRECTION

Patent No. 3,623,719          Dated November 30, 1971

Inventor(s) Jiri Dokoupil, et al

It is certified that error appears in the above-identified patent and that said Letters Patent are hereby corrected as shown below:

Column 8, line 12, after "gear means" insert -- , motor means -- .

Signed and sealed this 31st day of October 1972.

(SEAL)
Attest:

EDWARD M. FLETCHER, JR.
Attesting Officer

ROBERT GOTTSCHALK
Commissioner of Patents